Patented Dec. 8, 1931

1,835,600

UNITED STATES PATENT OFFICE

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA

METHOD OF EXTRACTING OXIDIZED BODIES FROM OXIDIZED HYDROCARBON MIXTURES

No Drawing.   Application filed June 16, 1928.   Serial No. 286,055.

In several copending applications I have described a vapor phase catalytic process for making intermediate partial oxidation products from petroleums or hydrocarbon mixtures from any source, such, for example, as shale oils or oils from the low temperature distillation of coal. Some of such pending applications are Serial No. 272,567, filed January 22, 1919; Serial No. 281,124, filed March 7, 1919, now Patent No. 1,697,653, granted January 1, 1929; Serial No. 335,939, filed November 5, 1919, now Patent No. 1,759,620, granted May 20, 1930; and Serial No. 435,355, filed January 6, 1921.

The oxidized bodies, such as alcohols, ethers, aldehydes, ketones and esters, serve as excellent solvents for gums, resins and nitrocellulose in the preparation of lacquers.

In my copending applications, Serial No. 745,024, filed October 21, 1924, now Patent No. 1,782,964, granted November 25, 1930, and Serial No. 747,106, filed October 31, 1924, I have described methods of extracting the more highly oxidized bodies from the condensed oxidation mixtures by the use of selective solvents, such as an alcohol-water mixture. Those methods are particularly effective for the extraction of oxidized bodies from mixtures boiling from 50° C. to 250° C., and also for the heavier fractions from some classes of oxidized oils.

Many lacquer formulas require, in addition to the more volatile solvent mixtures above referred to, higher molecular weight solvents, known in the lacquer art as plasticizers. Such higher weight solvents usually do not volatilize but remain in the film, making it more flexible and serving to hold the cellulose material in the gel condition as the lighter portions of the solvent mixture evaporate.

Oxidation mixtures containing bodies of this plasticizer type, may be obtained by the catalytic vapor phase and air mixture oxidation of heavier oils, such, for example, as various lubricating stocks or wax distillate. The oxidized bodies thus obtained may have boiling points above 300° C. and make excellent plasticizers.

In extracting the desired plasticizer mixtures from these heavier oxidized oil fractions, I have found difficulty in employing either methyl alcohol or ethyl alcohol, and also normal butyl alcohol, in the alcohol-water mixture.

After considerable experimenting on the problem of extracting the more highly oxidized portions from these heavier oxidized fractions, I have discovered that isopropyl alcohol is of special advantage. This alcohol is now an article of commerce, and even when considerably diluted with water I have found that it possesses the property of dissolving out the desired high molecular weight bodies from these condensed heavy oxidation mixtures. In extracting the desired bodies from the heavy fractions of an oxidized Pennsylvania wax distillate, or of Pennsylvania gas oil, the treatment by the ethyl-alcohol-water extraction proved very difficult, while the isopropyl alcohol acted efficiently in such extraction.

During preliminary experiments, I found that 98% isopropyl alcohol was completely miscible with light oxidation oils, for example, those boiling below 200° C. It was also found to be completely miscible with some, but not all, of the oxidized oils of heavier fractions—300° C. and above. Complete miscibility, however, is not necessary for successful extraction in these cases, since a top oil layer, which forms where an alcohol of high concentration is used, is always high in content of hydrocarbons and slightly oxidized bodies; and still more of such materials are carried into the top oil layer by the cautious addition of water to the alcohol layer.

In the case of such light fractions, the isopropyl alcohol remained in the oil layer, and this showed it to be undesirable for extracting the fractions of oxidized oil boiling below 200° C.

But with heavier fractions of the oxidized oil, the isopropyl alcohol was found to have superior qualities as an extracting agent for taking out the esters, alcohols, ethers, ketones and aldehydes from the oxidized oil.

Examples

Taking the condensed product from the partial oxidation of Pennsylvania gas oil—the vacuum distilled fraction above 300° C.; 50 cc. of this fraction above 300° C. was shaken thoroughly with 50 cc. of 98% isopropyl alcohol. The alcoholic solution formed a top layer. The lower hydrocarbon solution was drawn off and water added to the remaining alcoholic solution to bring the alcohol to approximately a 90% concentration with reference to the water present; that is, 5 cc. of water were added.

A small amount of oil then separated in a top layer. As this consisted of the high concentration hydrocarbon portions, it was drawn off, leaving the 90% isopropyl alcohol solution of the more highly oxidized bodies. These high molecular weight oxidized bodies were then separated from the isopropyl alcohol solution by running the solution into 50 cc. of water. An amount of the highly oxidized mixture equal to 9% by volume of the original oxidized oil fraction was obtained. This was tested for its solvent properties on ordinary "one-half second" lacquer nitrocellulose, and proved to be entirely satisfactory. As this product boils above 300° C., it makes an ideal plasticizer for lacquer formulas, with the advantage of low cost of preparation as compared to the high priced plasticizers now in use. The solvents thus obtained usually contain esters, aldehydes and ketones of different molecular weights, the average weight depending somewhat upon the raw material used in the partial oxidation process.

When ordinary ethyl alcohol was used as the extracting solvent on the same fraction, in the same general manner, only 3.7% of plasticizer was recovered, thus showing the great superiority of isopropyl alcohol as the extracting medium in such case.

In another example, I took the condensed product from vapor phase partial oxidation of Pennsylvania wax distillate—a product of cracking—and employed a heavy portion condensed out in a bubble tower by fractional condensation. In this case, extraction was carried out as described in the preceding experiment, using an 80% isopropyl alcohol and 20% water mixture. 50 cc. of the heavy oxidized oil were treated with 50 cc. of the extracting mixture. The manipulation was the same as in the first example, and an amount of good plasticizer was obtained equal to 30% by volume of the original oxidized heavy fraction.

The advantages of my invention result from the discovery that isopropyl alcohol has special selective and extracting properties for the heavier portions of my partial oxidation product. Changes may be made in the raw material used in the main vapor phase air mixture partial oxidation process and cracked fractions may be used therein and the proportions of the extracting agent may be changed, etc., without departing from my invention.

I claim:

1. In the method of treating an oily liquid partial oxidation product containing oxygen derivatives in the range from alcohols to oxygenated organic acids, the step consisting in dissolving the more highly oxidized liquid bodies in dilute isopropyl alcohol and separating them from the liquid less highly oxidized bodies of the mixture.

2. In the method of treating the fraction boiling above 200° C. of an oily liquid partial oxidation product containing oxygen derivatives in the range from alcohols to oxygenated organic acids, the step consisting in dissolving the more highly oxidized liquid bodies in dilute isopropyl alcohol and separating them from the liquid less highly oxidized bodies of the mixture.

In testimony whereof I have hereunto set my hand.

JOSEPH HIDY JAMES.